United States Patent [19]

Tanahashi et al.

[11] Patent Number: 4,732,116

[45] Date of Patent: Mar. 22, 1988

[54] TWO-CYCLE INTERNAL COMBUSTION ENGINE

[75] Inventors: Toshio Tanahashi, Susono; Norihiko Nakamura; Michiaki Ujihashi, both of Mishima; Hiroshi Noguchi, Gotenba; Toshio Ito, Susono; Toyokazu Baika, Susono; Katsuhiko Hirose, Susono; Kingo Horii, Susono, all of Japan

[73] Assignee: Toyota Jidosha Kabushiki Kaisha, Japan

[21] Appl. No.: 61,976

[22] Filed: Jun. 15, 1987

[30] Foreign Application Priority Data

Jul. 2, 1986 [JP] Japan .................. 61-154231

[51] Int. Cl.⁴ .............................................. F02B 75/02
[52] U.S. Cl. .................. 123/65 BA; 123/568; 123/52 MF
[58] Field of Search ............. 123/90.16, 90.17, 193 H, 123/52 MF, 430, 295, 302, 301, 65 PE, 65 VD, 65 P, 65 E, 65 BA, 568; 60/313, 314

[56] References Cited

U.S. PATENT DOCUMENTS

| | | | |
|---|---|---|---|
| 2,958,315 | 11/1960 | Williams | 123/65 VC |
| 3,808,807 | 5/1974 | Lanpheer | 60/313 |
| 4,318,373 | 3/1982 | Soubis | 123/568 |
| 4,357,917 | 11/1982 | Aoyama | 123/90.16 |
| 4,543,928 | 10/1985 | Von Seggern . | |
| 4,548,175 | 10/1985 | Kawai et al. | 123/308 |
| 4,580,533 | 4/1986 | Oda et al. | 123/90.16 |
| 4,616,605 | 10/1986 | Kline | 123/65 VD |
| 4,682,576 | 7/1987 | Nakamura et al. | 123/52 MF |

FOREIGN PATENT DOCUMENTS

| | | | |
|---|---|---|---|
| 48-51126 | 7/1973 | Japan . | |
| 59-22250 | 7/1984 | Japan . | |
| 60-5770 | 2/1985 | Japan . | |
| 0164608 | 8/1985 | Japan | 123/90.16 |
| 0247006 | 12/1985 | Japan | 60/323 |

*Primary Examiner*—Charles J. Myhre
*Assistant Examiner*—David A. Okonsky
*Attorney, Agent, or Firm*—Parkhurst & Oliff

[57] ABSTRACT

A two-cycle internal combustion engine comprises a cylinder head having two intake ports and an exhaust port opened to a combustion chamber, to which compresses fresh air is introduced via two intake valves. The intake and exhaust valves are operated in response to a crank angle. During an idling or light load running condition, an air control valve closes the second intake port. The exhaust valve is opened earlier than the second intake valve, and the first intake valve is opened later than the second intake valve, while the speed of the downward movement of the piston is relatively high. An exhaust gas swirl rotating around a cylinder axis is formed when the exhaust gas flows back into the condition chamber and the fresh air is slowly introduced via the first intake valve onto the exhaust gas swirl in the idling or light load condition. A large amount of fuel is rapidly introduced into the combustion chamber via the second intake valve in a heavy load condition.

4 Claims, 20 Drawing Figures

TWO-CYCLE INTERNAL COMBUSTION ENGINE

BACKGROUND OF THE INVENTION

1. Field of the Invention

This invention relates to a two-cycle internal combustion engine and, more particularly, to a two-cycle engine having two intake valves and at least one exhaust valve which are operated in response to a crank angle.

2. Description of the Related Art

Japanese Examined Patent Publication No. 60-5770 discloses an open-chamber type two-cycle engine having intake and exhaust valves. In this two-cycle engine, when a piston is at bottom dead center, both valves are opened. Fresh air is introduced into a combustion chamber via the intake valve and along the cylinder wall so as to form a vertical loop flow. The boundary between the fresh air and the exhaust gas moves from a position in the vicinity of the intake valve to the center of the cylinder, and then to a position in the vicinity of the exhaust valve, so that the fresh air is substituted for the exhaust gas over the whole region in the combustion chamber.

In this known two-cycle engine, there are no particular problems when it is running in a heavy load condition. However, in an idling or light load condition, the flow of fresh air is so small that a large amount of exhaust gas remains in the cylinder, which prevents the fresh air from concentrating around the cylinder head having an ignition spark plug. This is because, according to the vertical loop flow, the main part of the fresh air moves to the lower part of the cylinder. Therefore, initial burning by the spark plug is disturbed and/or the generation of a combustion flame core is prevented. Accordingly, due to the reduction of flame transmitting speed, a misfire or change of combustion may occur.

U.S. Pat. No. 4,543,928 to von Seggern discloses a two-cycle engine in which an air swirl is formed about a cylinder axis and stratification is obtained between the mixture in the ignition region and the air in the piston region. However, this swirl is not an exhaust gas swirl and no stratification is obtained between the exhaust gas and the fresh air.

SUMMARY OF THE INVENTION

An object of this invention is to provide a two-cycle engine, in which two intake ports and an exhaust port provided in a cylinder head are opened to a combustion chamber, capable of attaining a stratification between fresh air and exhaust gas by collecting the fresh air around the cylinder head (a spark plug), a especially in an idling or light load condition, so that it will easily burn even when only a small amount of fuel is present.

Another object of this invention is to provide a two-cycle engine, wherein two intake ports and an exhaust port provided in a cylinder head are opened to combustion chamber, capable of introducing a large amount of fresh air to improve output power in a heavy load condition.

According to the present invention, there is provided a two-cycle internal combustion engine comprising: a cylinder head having first and second intake ports for introducing fresh air into a combustion chamber and at least one exhaust port for discharging exhaust gas from the combustion chamber; an air charging means for supplying compressed fresh air to the intake ports; first and second intake valves and at least one exhaust valve for opening and closing the first and second intake ports and the exhaust port, respectively; and a valve operating means operated in response to a crank angle; characterized in that the engine further comprises: an inlet air control valve for substantially closing the second intake port during an idling or light load running condition of the engine; an exhaust system having a means for substantially restraining a pulsation pressure of exhaust gas in the exhaust port during at least the idling or light load running condition of the engine; the valve operating means including a means for opening the exhaust valve earlier than the second intake valve and opening the first intake valve later than the second intake valve, while a speed of the downward movement of the piston is relatively high, so that a part of exhaust gas in the exhaust port flows back to the combustion chamber; and, means for forming an exhaust gas swirl rotating around a cylinder axis of the combustion chamber when the exhaust gas flows from the exhaust port back to the combustion chamber, so that fresh air is slowly introduced to the exhaust gas swirl in the combustion chamber during the idling or light load running condition.

In the present invention, in an idling or light load condition, fresh air slowly introduced into the combustion chamber through the first intake port is collected around the cylinder head having a spark plug, and a suitable stratification can be obtained between a lower exhaust gas region and an upper fresh air region, which is heated and activated by the heat of the adjacent exhaust gas, so that easy burning can be achieved.

On the other hand, in a heavy load condition, a large amount of fresh air is rapidly introduced into the combustion chamber through the early opening second intake port. Therefore, after the exhaust valve and the second intake valve are opened, a so-called cross-scavenging can be obtained, so that output power in that condition can be improved.

DESCRIPTION OF THE PREFERRED EMBODIMENTS

Figure 1:
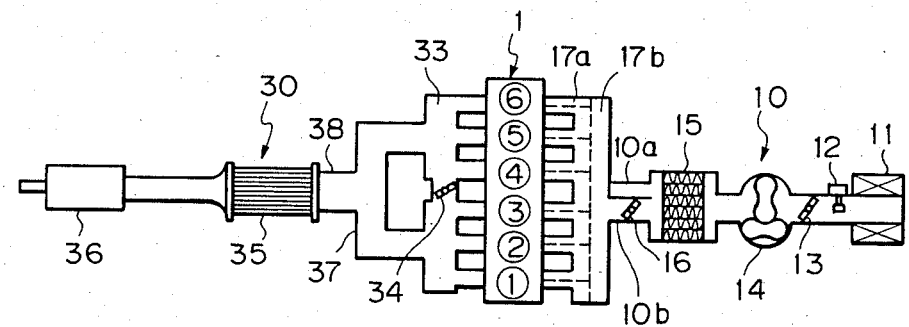
FIG. 1 is a schematic view of a six-cylinder two-cycle internal combustion engine according to the present invention.
Figure 2:
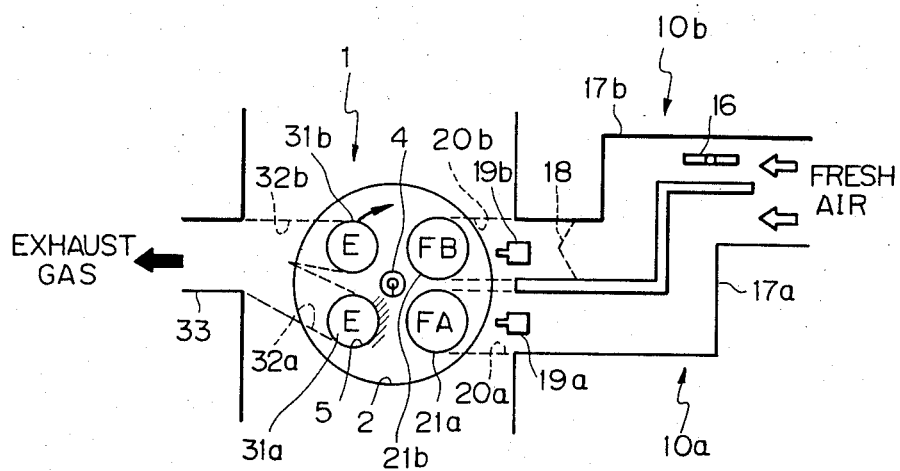
FIG. 2 is a schematic view illustrating a main part of the two-cycle engine shown in FIG. 1.
Figure 3:
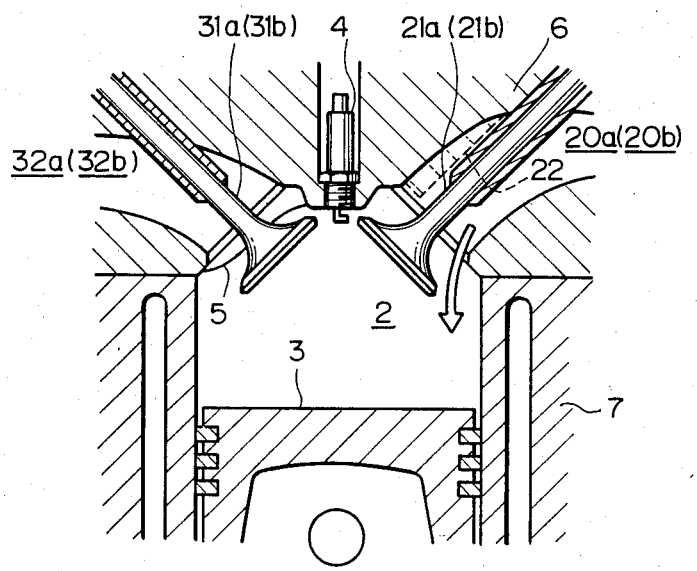
FIG. 3 is a cross-sectional view illustrating a main part of the two-cycle engine shown in FIG. 1.

Referring now to FIGS. 1, 2, and 3, reference numeral 1 denotes an engine body; 10, an air intake system; and 20, an exhaust system. In the engine body 1, reference numeral 2 denotes a combustion chamber (cylinder); 3, a piston; 4, an ignition spark plug; 5, maskings; 6, a cylinder head, and 7, a cylinder block. In the intake system 10, reference numeral 11 denotes an air cleaner; 12, an air flow meter; 13, a throttle valve; 14, a mechanical supercharger; 15, an intercooler; 16, an inlet air control valve; 17a and 17b, surge tanks; 18, a reed valve; 19a and 19b, fuel injectors; 20a and 20b, first and second intake ports; and 21a and 21b, first and second intake valves. In the exhaust system 30, reference numerals 31a and 31b denote exhaust valves; 32a and 32b, exhaust ports; 33, an exhaust manifold; 34, an exhaust control valve; 35, a catalyzer; and 36, a muffler.

The inlet air flows through the air cleaner 11 and is regulated by the throttle valve 13. The air flow meter 12 is provided between the air cleaner 11 and the throttle valve 13 and meters the flow of inlet air. Located downstream of the throttle valve 13 is a mechanical supercharger 14, which compresses the inlet air. The inlet air heated by the supercharger 14 is then cooled by the intercooler 15 disposed downstream thereof, to increase the volumetric efficiency of the inlet air. The mechanical supercharger 14 may be, for example, a Roots pump type supercharger including a housing in which a pumping operation is carried out to compress the inlet air. The supercharger 14 is, as well known, connected to a crankshaft of the engine by pulleys and a belt (not shown in the drawings), to rotate at a speed corresponding to the engine revolutional speed. A vane-pump or the like also may be used in place of the above-mentioned Roots pump 14.

Downstream of the intercooler 15, the intake system 10 is divided into two inlet passages, i.e., an inlet passage 10a for a light load and another inlet passage 10b for a heavy load. The passage 10b is provided with the inlet air control valve 16, which may be a general butterfly valve closed during the idling or light load engine condition and opened during a heavy load (including a middle load) condition. The inlet passages 10a and 10b are connected to the surge tanks 17a and 17b, respectively. The downstream sides thereof are divided by manifolds and led to the respective cylinders and connected to the respective combustion chambers via the first and second intake ports 20a and 20b formed in the cylinder head 6. These intake ports 20a and 20b are directly opened to the combustion chamber 2 from the cylinder head 6. Fuel injectors 19a and 19b are provided in the intake ports 20a and 20b, respectively, in each cylinder. The one-way valve 18 (reed valve) may be provided upstream of the fuel injector 19b in the second intake port 20b for a heavy load. It is not necessary to provide a reed valve in the first intake port 20a, for the reason given later.

One of the fuel injectors 19a injects fuel toward the region of a spark plug 4 in any engine condition, and the other fuel injector 19b injects fuel toward the center of the combustion chamber 2 during a heavy load condition wherein the inlet air control valve 16 is opened. Therefore, the fuel injector 19b has a large-sized injection nozzle and injects more fuel than the fuel injector 19a. The inlet air mixed with injected fuel flows into the combustion chamber 2 via the first and second intake ports 20a and 20b provided with the first and second poppet type intake valves 21a and 21b, respectively. The first and second intake valves 21a and 21b are opened or closed in a timing synchronized with the crank angle, as will be mentioned later.

Figure 4:
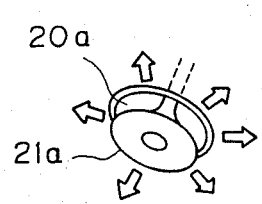
FIGS. 4 and 5 are schematic views illustrating fresh air flowing into a combustion chamber through two intake valves, respectively.
Figure 5:
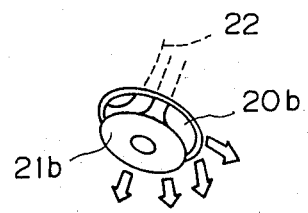

The air/fuel mixture flows from the first and second intake ports 20a and 20b to the combustion chamber 2, as shown in FIGS. 4 and 5. That is, the air/fuel mixture flows from the first intake port 20a along substantially the whole periphery of the bevel face of the intake valve 20a, as shown in FIG. 4. On the other hand, as shown in FIG. 5, the air/fuel mixture flows from the second intake port 20b along a part of the periphery of the bevel face of the intake valve 20b, i.e., region of the cylinder wall, and straight downward along the cylinder wall. To this end, a masking wall 22, for example, as shown by a dotted-line in FIGS. 3 and 5, is formed on the inner wall of the second intake port 20b in the vicinity of the second intake valve 21b and near to the center of the cylinder. Therefore, a large amount of the air/fuel mixture (fresh air) flows through the intake port 20b at a high speed and along the inclined face of the masking wall 22, so that the air/fuel mixture is directed to the side of cylinder wall and downward to the combustion chamber 2 along the cylinder wall.

Two exhaust ports 32a and 32b are also directly opened to the combustion chamber 2 from the cylinder head 6 at positions opposite to the intake ports 20a and 20b, respectively. These exhaust ports 32a and 32b are also opened or closed by the poppet-type exhaust valves 31a and 31b, respectively, in a timing synchronized with the crank angle, as will be mentioned later. The exhaust ports 32a and 32b are combined and connected to an exhaust manifold 33 at the downward side and in the vicinity of the exhaust valves 31a and 31b. The exhaust manifold 33 is provided with an exhaust control valve 34 which interrupts or connects the flow between the manifold pipes of Nos. 1 to 3 cylinders and the manifold pipes of Nos. 4 to 6 cylinders. Two manifold portions 33a and 33b are connected by a two-way manifold 37, which is connected to an exhaust pipe 38.

In the illustrated six-cylinder two-cycle engine, assuming that the cycle is repeated in the order 1, 6, 2, 4, 3, 5 at each 60° crank angle, the operation cycle is repeated at each 120° crank angle in each cylinder group 1, 2, and 3, or 4, 5, and 6. A catalyzer 35 and a muffler 36 are located downstream of the exhaust pipe 38. The exhaust control valve 34 serves merely to control the exhaust gas pressure and, therefore, a general butterfly valve may be sufficient for that purpose, since strict sealing is not required. However, it is understood that a poppet-type valve or the like having a high sealing effect may be used. The exhaust control valve 34 is controlled in such a manner that it opens in the idling or light load running condition and closes in the high load running condition.

The combustion chamber 2 in each cylinder is defined between the cylinder head 6, the piston 3, and the cylinder block 7 and is provided with an ignition spark plug 4 at the center of the cylinder head 6. Around the exhaust valves 31a and 31b, the cylinder head 6 is provided with masking portions 5, which facilitate the formation of a swirl in the exhaust gas, particularly an appropriate swirl rotating around the axis of the cylinder (combustion chamber 2) when the exhaust gas flows back to the combustion chamber 2 from the exhaust ports 32a and 32b via the bevel faces of the exhaust valves 31a and 31b, especially in the idle or light load running condition. In place of (or in addition to) such masking portions 5, one or both of the exhaust ports 32a and 32b may be an eccentric exhaust port, as shown at 32b in FIG. 2, so that a swirl is formed in the exhaust gas when it flows in the tangential direction back to the combustion chamber 2 from the exhaust port 32b.

Figure 6:
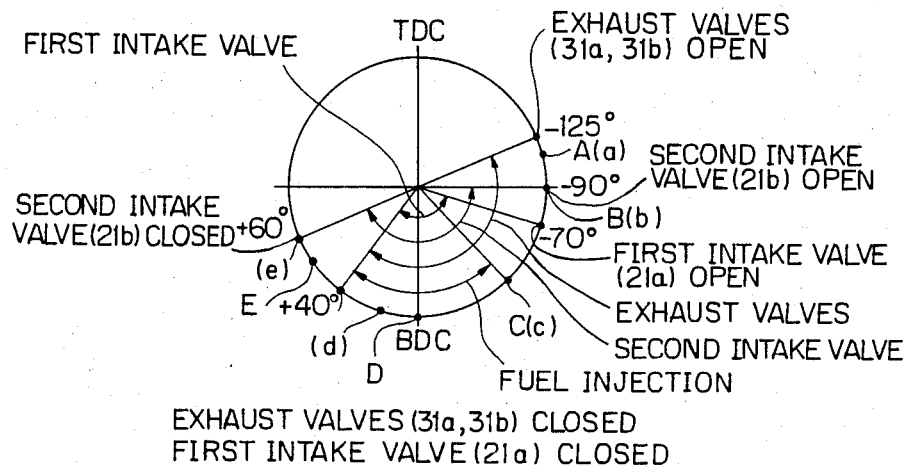
FIG. 6 is a timing chart illustrating the opening and closing of exhaust and intake valves and the injection timing by fuel injectors.

The first and second intake valves 21a and 21b and the exhaust valves 31a and 31b are operated, although not illustrated, by cam members mounted on a cam shaft which is rotated at the same speed as the crank shaft, so that these valves are opened and closed in accordance with predetermined timings, as shown in FIG. 6. That is, the exhaust valves 31a and 31b are first opened simultaneously at approximately $-125°$ with respect to the bottom dead center (BDC) and then the second intake valve 21b is opened approximately $-90°$ earlier than the first intake valve 21a, which is then opened at approximately $-70°$. On the other hand, the exhaust valves 31a and 31b are closed simultaneously at approximately $+40°$ with respect to the bottom dead center (BDC). At approximately the same time ($+40°$), the first intake valve 21a is closed earlier than the second intake valve 21b, which is then closed at approximately $+60°$. The fuel injectors 19a and 19b may inject fuel approximately between $+45°$ to $-40°$. Otherwise, the injection timings of these two fuel injectors 19a and 19b may be different to conform with the opening timings of the intake valves 21a and 21b.

Figure 7:
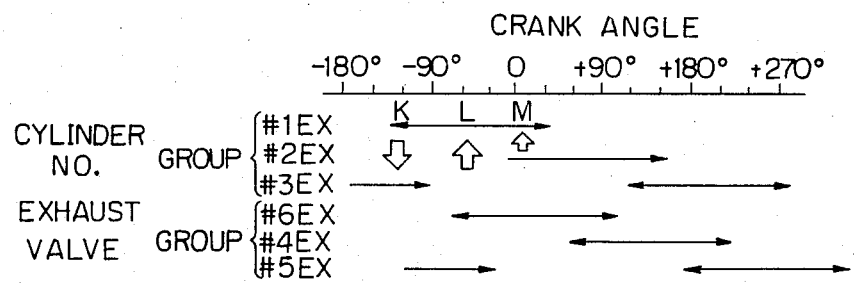
FIG. 7 is an opening and closing timing chart of exhaust valves in a plurality of cylinders.

In the illustrated six-cylinder two-cycle engine, assuming that the operation cycle is repeated in the order 1, 6, 2, 4, 3, 5 at each 60° crank angle, the exhaust valves 31a and 31b of each cylinder are opened and closed as illustrated in FIG. 7. The solid lines in FIG. 7 indicate time periods, with respect to the crank angle of the cylinder No. 1, during which the exhaust valves 31a and 31b in the respective cylinders are opened. On the other hand, the exhaust control valve 34 is controlled in such a manner that it opens at least in the idling or light load running condition, as mentioned above.

Therefore, in the idling or light load running conditions, all the branches of the exhaust manifold 33 are connected to each other. For example, as illustrated in FIG. 7, in the initial period K in the cylinder No. 1 during which the exhaust valves 31a and 31b start to open, the exhaust valves in the cylinder No. 3 are still open. In the intermediate period L, the exhaust valves in cylinder No. 6 start to open, and in the final period M, the exhaust valves in the cylinder No. 2 start to open. In particular, due to the exhaust pressure from the other cylinder group (i.e., cylinder No. 6), the exhaust ports 32a and 32b are always subjected to a substantial positive pressure and, therefore, the effects of the exhaust pulsation charge in each cylinder are not generated. In the other cylinders, the same operation is performed so that the exhaust pressure in each cylinder cooperatively interferes with each other pressure and controls the back pressure, as mentioned later.

On the other hand, in the heavy load running condition of the engine, the exhaust control valve 34 is closed so that the exhaust pressure is subjected only slightly to the back pressure from the cylinder No. 6. Therefore, the exhaust ports 32a and 32b in the cylinder No. 1 are subjected to pressure interference (M) from the cylinder No. 2 and, therefore, the effects of the exhaust pulsation charge are generated. To avoid the pulsation pressure which would be generated just after a blowdown in a low speed running condition, a resonance chamber (not shown) may be connected to the exhaust port.

The operation of a six-cylinder two-cycle engine according to this invention will now be described with reference to FIGS. 6 through 9.

First, in the idling or light load running condition of the engine, the inlet air control valve 16 is closed and the exhaust control valve 34 is opened. During the downward movement of the piston 3, the exhaust valves 31a and 31b start to open when the piston 3 arrives at a point approximately $-125°$ from the top dead center (BDC) in FIG. 6. Therefore, at a region (A) in FIG. 6, exhaust gas flows out through the exhaust valves 31a and 31b which are just opened (weak blowdown P in FIG. 8). This blowdown (P) is quickly completed, since in the idling or light load condition, the pressure in the combustion chamber 2 is low and the amount of exhaust gas is small. That is, in the exhaust ports 32a and 32b, although the exhaust gas pressure temporarily rises to 2 to 3 kg/cm$^2$, it is immediately reduced to and balanced at about 1.05 kg/cm$^2$. When the engine is running at a high speed, the exhaust gas pressure is more stably balanced.

Then, at a point (B), i.e., crank angle $-90°$ in FIG. 6, the speed of the downward movement of the piston 3 is relatively high. Therefore, the cylinder pressure becomes a vacuum and is influenced by the exhaust gas pressure of the other cylinder group (i.e., cylinder No. 6), as shown at L in FIG. 7. Therefore, high temperature exhaust gas which has been once "blowndown" to the exhaust ports 32a and 32b flows back to the combustion chamber 2, as shown at Q in FIG. 8. An exhaust gas swirl (R) is formed around the axis of the cylinder chamber 2 by a swirl forming means, i.e., the eccentric port 32b and the maskings 5. This swirl is relatively slow and serves to prevent an escape of the exhaust gas heat in the combustion chamber 2.

Fresh air does not flow in at the point just after the first intake valve 21a is opened, since the pressure in the first intake port 20a is controlled by the throttle valve 13 and the lift of the first intake valve 21a is so small that the port is further throttled. Therefore, the flow back of the exhaust gas from the exhaust ports 32a and 32b proceeds further. When the piston 3 moves further downward and the speed thereof becomes slow, the lift of the first intake valve is increased, as shown at C in FIGS. 6 and 8, and the fresh air (mixture), which has been controlled by the throttle valve 13 and compressed at a low pressure by the supercharger 14, flows into the combustion chamber 2 via the first intake valve 21a in the first intake port 20a. As the air control valve 16 is closed, no fresh air flows through the second intake port 20b.

As mentioned above, the fresh air flows from the intake port 20a along substantially the whole periphery of the bevel face of the intake port 20a, as shown in FIG. 4. In this running condition, the speed of the downward movement of the piston 3 is relatively slow, the pressure reduction in the cylinder is small and, therefore, the velocity of the fresh air is low. Also, the first intake valve 21a is opened later than the second intake valve 21b. Therefore, the fresh air flows slowly onto the exhaust swirl (R) in the combustion chamber 2 and is collected at the upper portion thereof, i.e., around the spark plug 4 opposite to the cylinder head 6. Thus, a suitable stratification consisting of a fresh air region (S) at the cylinder head (upper) side and an exhaust gas region (R) at the piston (lower) side is obtained in the combustion chamber 2. As the exhaust gas (R) swirls around the cylinder axis, this stratification of the fresh air (S) and exhaust gas (R) is maintained until the piston 3 arrives at the bottom dead center (BDC), as shown at D in FIGS. 6 and 8.

Figure 8:
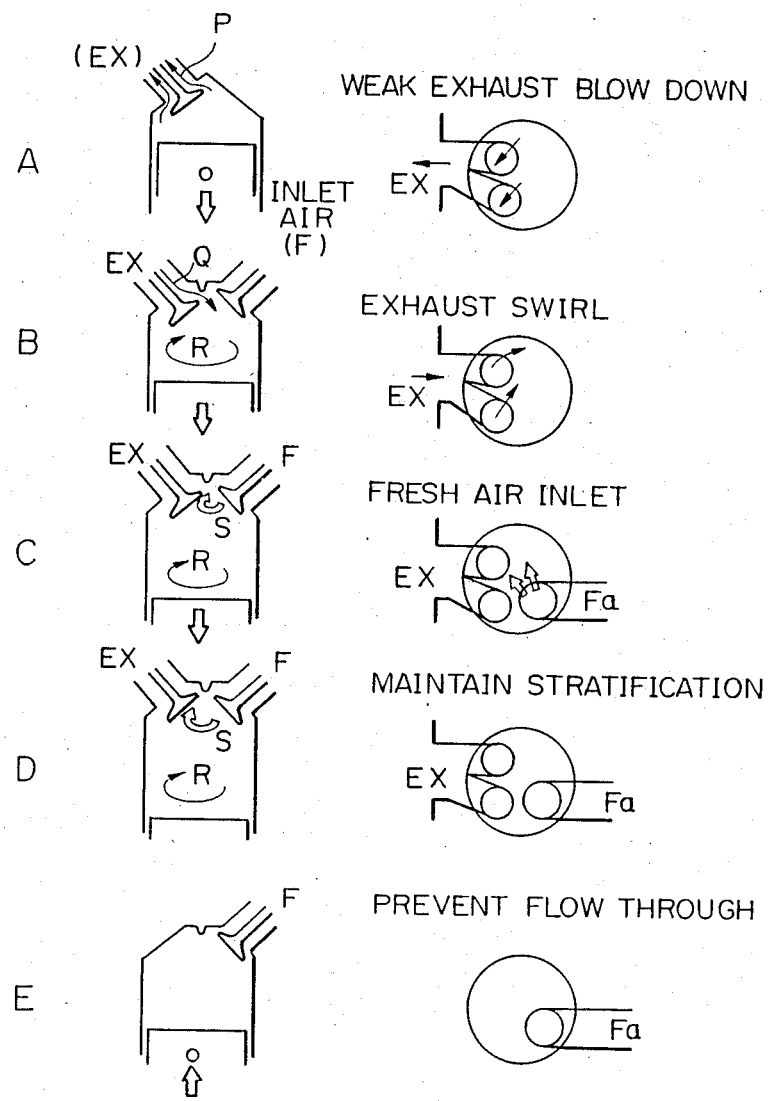
FIGS. 8a–8e are views for explaining, in series, the changes of exhaust gas and fresh air in an idling or light load running condition of the engine.
Figure 9:
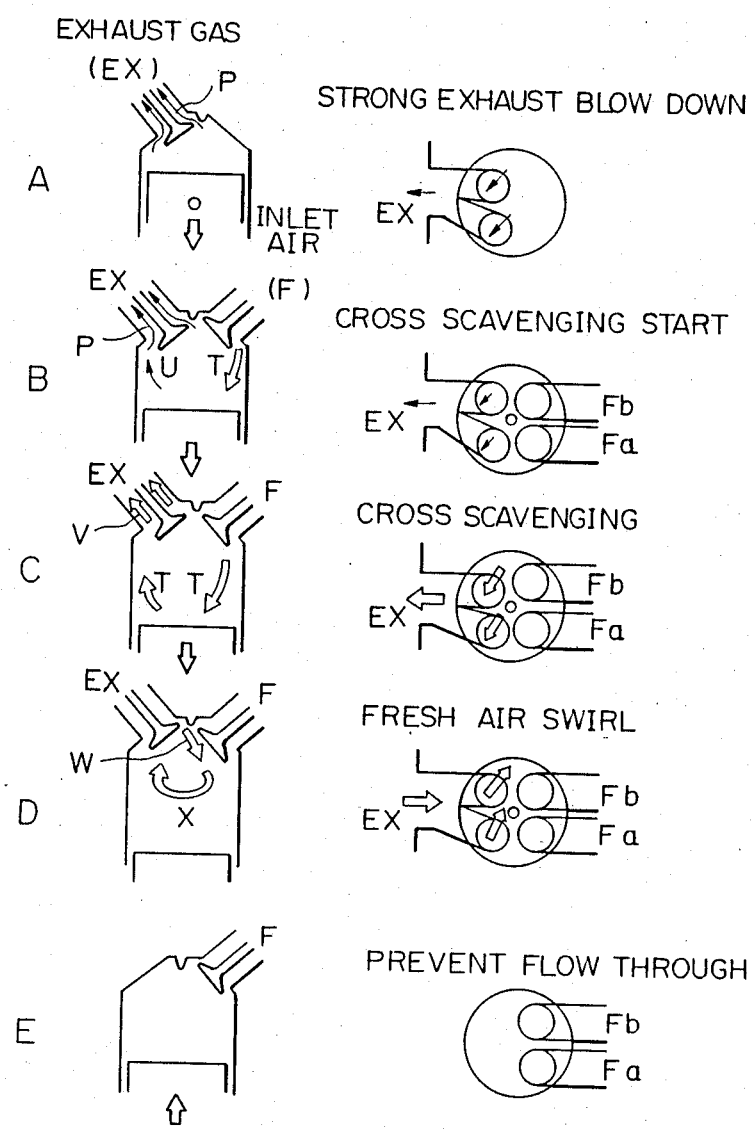
FIGS. 9a–9b views for explaining, in series, the changes of exhaust gas and fresh air in a heavy load condition.

Even after the first intake valve 21a is closed and the fresh air intake is substantially ended, as shown at E in FIGS. 6 and 8, the stratification of the fresh air (S) and exhaust gas (R) is still maintained. As this stratification is also maintained until the end of the pressurizing stroke, the fresh air in the vicinity of the cylinder head 6 is heated and activated by the high temperature exhaust gas region near the piston 3. Therefore, if this engine is in the idling condition, the mixture is readily burnt by the spark plug 4 at the end of the pressurizing stroke and the flame spreads so that a stable combustion can be attained. If the engine is in the light load running condition after the engine is warmed up, the temperature of the exhaust gas in the cylinder chamber is high and activation of the fresh air is promoted, so that it is possible for the fresh air to self-ignite without ignition by the spark plug 4, due to the adiabatic compression during the pressurizing stroke.

At points D and E, as illustrated at L and M in FIG. 7, the pressure in the exhaust ports 32a and 32b is always positive in the idling or light load running condition due to the exhaust gas (back) pressure from the other cylinders exerted thereon. Therefore, there is substantially no charging effect due to exhaust pulsation, so that the fresh air is prevented from flowing out to the exhaust system and the swirl flow (R) is not disturbed. Therefore, a stable stratification combustion can be attained.

As mentioned above, in the idling or light load running condition, the exhaust pulsation charging effect is prevented by closing the exhaust control valve 34, and an exhaust swirl is generated due to the exhaust gas blowdown. On the other hand, the fresh air is introduced to the combustion chamber in the vicinity of cylinder head 6 through the first intake port 20a by closing the intake air control valve 16. Therefore, a stratification of the fresh air and exhaust gas swirl is created, and accordingly, in the warming-up or idling condition, a stable combustion can be obtained with ignition by the spark plug 4. In the after warmed-up and light load condition, as the exhaust gas is at a high temperature, it is possible for the fresh air to self-ignite without ignition by the spark plug 4. The swirl is not disturbed, since no fresh air flows into the combustion chamber 2 through the second intake port 20b.

In the heavy load running condition of the engine, the intake air control valve 16 is opened and the exhaust control valve 34 is closed. During the downward movement of the piston 3, the exhaust valves 31a and 31b start simultaneously to open at the point (a) in FIG. 6, as shown in FIG. 9A. The exhaust gas flows out abruptly (blowdown P) through the exhaust valves 31a and 31b which are just opened. The amount of exhaust gas in the heavy load condition is so large that the blowdown (P) is strong and continues for a relatively long time. The blowdown (P) is completed at a crank angle of $-90°$. Therefore, a large amount of exhaust gas is discharged. At a point (b) in FIG. 6, i.e., at a crank angle of $-80°$, the second intake valve 21b is first opened to introduce the fresh air (T), as shown in FIG. 9B. Therefore, the compressed fresh air (air-fuel mixture) starts to flow into the combustion chamber 2 through the second intake port 20b via the second intake valve 21b. The first intake valve 21a is then opened to also introduce the fresh air through the first intake port 20a.

In the heavy load condition, as the inlet air control valve 16 is opened as mentioned above, the fresh air flows through both the intake ports 20a and 20b. Especially, a large amount of fresh air flows rapidly through the intake port 21b into the combustion chamber 2 directly downward along the cylinder wall, as shown in FIG. 5. Therefore, as shown in FIG. 9B, a so-called cross-scavenging starts between the exhaust gas (U) and the fresh air (T). Then, as shown in FIG. 6(b) and (c) and FIGS. 9B and 9C (during a crank angle of from $-80°$ to $-50°$), the pressure in the exhaust ports 32a and 32b becomes temporarily a vacuum due to the charging effects of exhaust gas pulsation caused by the strong blowdown. Therefore, the introduction of fresh air is further promoted and a part of the fresh air (V) is temporarily accumulated in the exhaust ports 32a and 32b and the exhaust manifold 33.

Then, at a point (d) in FIG. 6(b) and FIG. 9D, a strong positive pressure as shown at M in FIG. 7 is exerted due to a strong blowdown of the other cylinder (the second cylinder) in which the exhaust valves thereof are just opened, so that the fresh air (W) which has been temporarily accumulated in the exhaust ports 32a and 32b and the exhaust manifold 33 now flows back to the combustion chamber 2. While the fresh air flows back through the eccentric exhaust port 32b and masking 5 into the combustion chamber 2, it forms a strong swirl (X). The first intake valve 21a is closed approximately at the same time as the exhaust valves 31a and 31b are closed. The second intake valve 21b is then closed, as shown at (e) in FIG. 6 and FIG. 9E. The fresh air no longer flows through the exhaust ports 32a and 32b.

Figure 10:
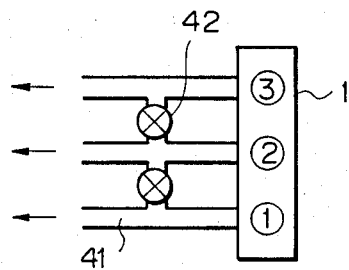
FIG. 10 is a schematic view of an exhaust gas control system in a three-cylinder two-cycle engine.

As mentioned above, in the heavy load condition, the inlet air control valve 16 is opened to rapidly introduce a large amount of fresh air, through the second intake valve 21b, downward along the cylinder wall of the combustion chamber 2, so that a so-called cross scavenging can be achieved. On the other hand, the exhaust control valve 34 is closed so as to generate a positive/negative exhaust gas pulsation, as shown in FIG. 10. This effect of exhaust pulsation among the cylinders promotes the introduction of the fresh air. That is, a part of the fresh air which has been once accumulated and heated in the exhaust ports and the exhaust manifold flows back to the cylinder, so that a large amount of fresh air can be supplied and a strong swirl is created, whereby transmission of the combustion flame is improved. As the first intake valve 21a is closed earlier than the second intake valve 21b (approximately at the same time as the exhaust valves 31a and 31b are closed), the first intake port 20a is no longer subjected to a dynamic pressure from the combustion chamber 2. Therefore, it is not necessary to provide a one-way valve in the first intake port 20a.

Although the above mentioned two-cycle engine has six-cylinders, a two-cycle engine according to the present invention may have three cylinders, or one or two cylinders.

In a three-cylinder engine, as shown in FIG. 10, exhaust pipes 41 of the respective cylinders are arranged independently to each other and bypass valves 42 are provided to mutually connect these exhaust pipes 41. In the idling or light load running condition of the engine, these bypass valves 42 are closed, so that the effective length of each exhaust pipe 41 becomes longer and an exhaust pulsation is not exerted on the exhaust pipes 41 of the other cylinders. Therefore, in this condition, the back (exhaust gas) pressure is always substantially positive. In the heavy load condition, these bypass valves 42 are opened, so that each exhaust pipe 41 is subjected to a blowdown M of back pressure in the other cylinder having a cycle delayed by 120°, in a similar manner to that shown in FIG. 7 and, therefore, charging effects due to exhaust pulsation, as mentioned above, can be expected.

Figure 11:
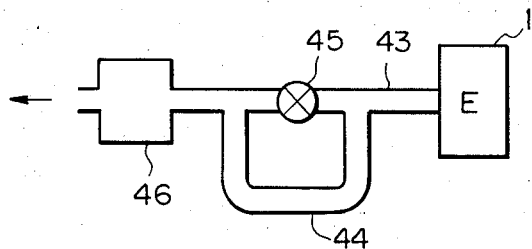
FIG. 11 is a schematic view of an exhaust system in a single-cylinder engine.
Figure 12:
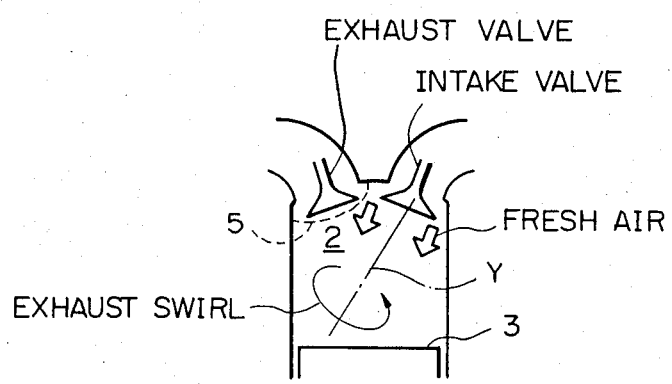
FIG. 12 is a schematic view illustrating exhaust gas swirl rotating around an inclined axis.

In a single-cylinder engine, as shown in FIG. 11, an exhaust pipe 43 is provided with an exhaust control valve 45 and a passage 44 for bypassing the valve 45. In the idling or light load condition, the valve 45 is closed, so that the effective length of the exhaust pipe 43 becomes substantially longer and, therefore, the back (exhaust gas) pressure is always substantially positive in this condition. In the heavy load condition, the valve 45 is opened, so that effective length of the exhaust pipe 43 becomes substantially shorter. Reference numeral 46 indicates a portion opened to the atmosphere. In a one or two-cylinder engine, however, the charging effects of exhaust pulsation cannot be expected.

As mentioned above, when the exhaust gas flows back to the combustion chamber 2, a swirl is formed by means of the masking 5 on the wall of the cylinder head and/or the eccentric port 32b. It may be desirable to form such a swirl rotating around an axis Y inclined from the vertical axis toward the intake valves, as shown in FIG. 11, by changing the shape of the maskings 5, for example. In this case, only a slight dynamic pressure is exerted on the intake valve (port) and, therefore, the fresh air is further prevented from flowing through the exhaust system. In any case, it is sufficient to ensure that the stratification is not disturbed but maintained between the exhaust gas swirl thus formed and the upper fresh air region. Therefore, the meaning of "around the cylinder axis" should be widely interpreted.

The present invention is also applicable to a six-cylinder two-cycle engine, in which the exhaust system is provided with no exhaust control valve, such as indicated at 34 (FIG. 1), but divided into two exhaust pipes, one for Nos. 1, 2 and 3 cylinders, and the other for Nos. 4, 5 and 6 cylinders.

A two-cycle engine according to the present invention also may be constituted as a diesel engine. In this case, a stratification can be also obtained between the fresh air before fuel injection and the exhaust gas. After the fresh air is sufficiently heated by the exhaust gas, fuel is injected directly into the combustion chamber and, therefore, it is possible that the fresh air will selt-ignite without ignition by a spark plug even at a relatively low compression ratio.

We claim:

1. A two-cycle internal combustion engine comprising: a cylinder head having first and second intake ports for introducing fresh air into a combustion chamber and at least one exhaust port for discharging exhaust gas from said combustion chamber; an air charging means for supplying compressed fresh air to said intake ports; first and second intake valves and at least one exhaust valve for opening and closing said first and second intake ports and said exhaust port, respectively; and a valve operating means operated in response to a crank angle; characterized in that said engine further comprises:

an inlet air control valve for substantially closing said second intake port during an idling or light load running condition of the engine;

said valve operating means including a means for opening said exhaust valve earlier than said second intake valve and opening said first intake valve later than said second intake valve, while a speed of the downward movement of the piston is relatively high, so that a part of exhaust gas in said exhaust port flows back to said combustion chamber; and, means for forming an exhaust gas swirl rotating around a cylinder axis of the combustion chamber when the exhaust gas flows from said exhaust port back to the combustion chamber, so that fresh air is slowly introduced onto said exhaust gas swirl in the combustion chamber during the idling or light load running condition.

2. A two-cycle engine as set forth in claim 1, wherein said engine further comprises at least one-way valve in said second intake port, so that air or gas is prevented from flowing back toward said air charging means.

3. A two-cycle internal combustion engine comprising: a cylinder head having first and second intake ports for introducing fresh air into a combustion chamber and at least one exhaust port for discharging exhaust gas from said combustion chamber; an air charging means for supplying compressed fresh air to said intake ports; first and second intake valves and at least one exhaust valve for opening and closing said first and second intake ports and said exhaust port, respectively; and a valve operating means operated in response to a crank angle; characterized in that said engine further comprises:

said cylinder head having said first intake port for directing the fresh air widely into the combustion chamber and said second intake port for directing the fresh air downward into the combustion chamber along the cylinder wall thereof;

a fuel injector provided in at least said first intake port for injecting fuel toward an ignition spark plug in the combustion chamber;

an inlet air control valve for substantially closing said second intake port during an idling or light load running condition of the engine;

said valve operating means including a means for opening said exhaust valve earlier than said second intake valve and opening said first intake valve later than said second intake valve, while the speed of the downward movement of the piston is relatively high, so that a part of exhaust gas in said exhaust port flows back to said combustion chamber; and, means for forming an exhaust gas swirl rotating around a cylinder axis of the combustion chamber when the exhaust gas flows from said exhaust port back to the combustion chamber, so that fresh air is slowly introduced onto said exhaust gas swirl in the combustion chamber during the idling or light load running condition.

4. A two-cycle engine as set forth in claim 3, wherein said engine further comprises at least one one-way valve in said second intake port, so that air or gas is prevented from flowing back toward said air charging means.

* * * * *